(12) United States Patent
Lin et al.

(10) Patent No.: US 11,159,251 B2
(45) Date of Patent: Oct. 26, 2021

(54) ANTENNA CONTROL METHOD AND COMMUNICATION SYSTEM CONTROL METHOD

(71) Applicant: Gemtek Technology Co., Ltd., Hsinchu (TW)

(72) Inventors: Yu-Min Lin, Hsinchu (TW); Chien Sheng Chen, Hsinchu (TW)

(73) Assignee: GEMTEK TECHNOLOGY CO., LTD., Hsinchu (TW)

( * ) Notice: Subject to any disclaimer, the term of this patent is extended or adjusted under 35 U.S.C. 154(b) by 96 days.

(21) Appl. No.: 16/654,228

(22) Filed: Oct. 16, 2019

(65) Prior Publication Data

US 2020/0328827 A1 Oct. 15, 2020

Related U.S. Application Data

(60) Provisional application No. 62/832,971, filed on Apr. 12, 2019.

(30) Foreign Application Priority Data

Jul. 26, 2019 (TW) .................................. 108126597

(51) Int. Cl.
*H04B 17/10* (2015.01)
*H04B 7/0408* (2017.01)

(52) U.S. Cl.
CPC ......... *H04B 17/104* (2015.01); *H04B 7/0408* (2013.01)

(58) Field of Classification Search
CPC . H04W 36/30; H04W 72/085; H04W 74/006; H04B 17/318; H04B 7/088; H04B 17/336; H04B 17/382; H04B 7/0695
See application file for complete search history.

(56) References Cited

U.S. PATENT DOCUMENTS

2010/0210219 A1* 8/2010 Stirling-Gallacher ......................
H04B 7/0695
455/67.11
2013/0315325 A1* 11/2013 Wang ................... H04B 7/0695
375/267

(Continued)

FOREIGN PATENT DOCUMENTS

CN   105052199 A   11/2015
CN   103155435 B   2/2016

OTHER PUBLICATIONS

Taiwan Patent Office, "Office Action", 108126597, dated Dec. 16, 2020, Taiwan.

*Primary Examiner* — Sophia Vlahos
(74) *Attorney, Agent, or Firm* — Locke Lord LLP; Tim Tingkang Xia, Esq.

(57) ABSTRACT

An antenna control method comprises obtaining a plurality of radio frequency signal parameters respectively in a plurality of measuring beam directions, generating a plurality of parameter groups according to the plurality of radio frequency signal parameters, selecting a target beam direction from the plurality of measuring beam directions according to the plurality of parameter groups, and controlling an antenna to transmit and receive signals in the target beam direction. In said antenna control method, two adjacencies of the plurality of measuring beam directions have an angle difference therebetween, and each of the plurality of parameter groups comprises more than one of the plurality of radio frequency signal parameters.

8 Claims, 8 Drawing Sheets

(56) References Cited

U.S. PATENT DOCUMENTS

2015/0282122 A1* 10/2015 Kim ..................... H04B 7/0408
                                                            370/329
2019/0327764 A1* 10/2019 Yoo ..................... H04W 72/044
2020/0052754 A1*  2/2020 Jung ..................... H04B 7/088

* cited by examiner

ANTENNA CONTROL METHOD AND COMMUNICATION SYSTEM CONTROL METHOD

CROSS-REFERENCE TO RELATED APPLICATIONS

This non-provisional application claims priority under 35 U.S.C. § 119(a) on provisional application No(s). 62/832,71 filed in U.S.A. on Apr. 12, 2019, and on patent application No. 108126597 filed in Taiwan (R.O.C.) on Jul. 26, 2019, the entire contents of which are hereby incorporated by reference.

BACKGROUND

1. Technical Field

This disclosure relates to an antenna control method, and particularly to a method for controlling the signal transceiving direction of an antenna.

2. Related Art

Nowadays, wireless communication technology is progressing, and it is inseparable from the life of modern people. For wireless communication technology, an antenna is a key component used to transmit and receive radio waves. In free space, any antenna radiates energy in all directions, but has a large directivity in a certain direction, that is, has better efficiency of signal transmission and reception. This certain direction is also called the best beam direction.

Therefore, how to decide the best beam direction of a communication system including one or more antenna devices to maximize the antenna gain is an important issue in the field of wireless communication.

SUMMARY

According to one or more embodiment of this disclosure, an antenna control method comprises obtaining a plurality of radio frequency signal parameters respectively in a plurality of measuring beam directions, generating a plurality of parameter groups according to the plurality of radio frequency signal parameters, selecting a target beam direction from the plurality of measuring beam directions according to the plurality of parameter groups, and controlling an antenna to transmit and receive signals in the target beam direction. In said antenna control method, two adjacencies of the plurality of measuring beam directions have an angle difference therebetween, and each of the plurality of parameter groups comprises more than one of the plurality of radio frequency signal parameters.

According to one or more embodiment of this disclosure, a communication system control method is applied to a communication system comprising a first antenna device and a second antenna device. The communication system control method comprises controlling the second antenna device to operate in an omnidirectional mode, and controlling the first antenna device to perform a target beam direction deciding procedure to decide a first target beam direction, controlling the first antenna device to operate in the first target beam direction and controlling the second antenna device to perform the target beam direction deciding procedure to decide a second target beam direction, and controlling the second antenna device to operate in the second target beam direction.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
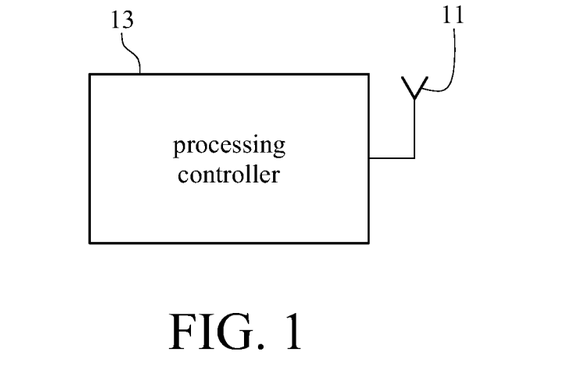
FIG. 1 is a function block diagram of an antenna device to which antenna control methods in embodiments of this disclosure are applied.
Figure 2:
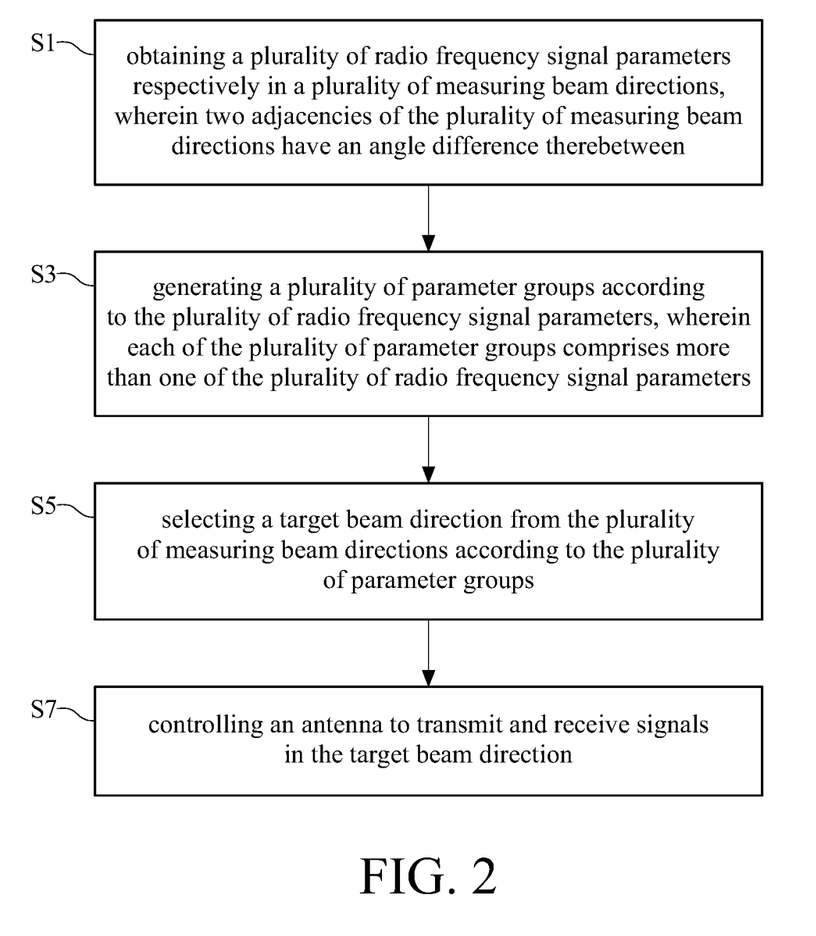
FIG. 2 is a flow chart of an antenna control method according to an embodiment of this disclosure.

This disclosure provides an antenna control method for selecting and controlling the signal transceiving direction of an antenna according to the parameters associated with the field pattern of the antenna. Please refer to FIGS. 1 and 2, wherein FIG. 1 is a function block diagram of an antenna device applied to antenna control methods in multiple embodiments of this disclosure, and FIG. 2 is a flow chart of an antenna control method according to an embodiment of this disclosure. As shown in FIG. 1, an antenna device 1 comprises an antenna portion 11 and a processing controller 13. The antenna portion 11 serves as a medium for transmitting and receiving radio signals. The processing controller 13 is configured to generate or process a signal which is to be fed in the antenna portion 11. The processing controller 13 can receive an external signal through the antenna portion 11, and control the signal transceiving direction of the antenna portion 11. The processing controller 13 can be a central processing unit, a microcontroller, a programmable logic controller, which is not limited in this disclosure.

In an embodiment, the antenna portion 11 of the antenna device 1 can comprise a signal transceiving component. For example, the signal transceiving component is in the form of monopole, dipole, loop, spiral, etc., which is not limited in this disclosure. In this embodiment, the processing controller 13 can control the signal transceiving component to transmit and receive signals towards various directions by rotating the signal transceiving component. In another embodiment, the antenna device 1 can be a smart antenna of which the antenna portion 11 comprises a number of signal transceiving component, wherein the signal transceiving components respectively have different signal transceiving directions. The processing controller 13 can transmit and receive signals towards various directions by enabling one or more signal transceiving components.

The antenna control method as shown in FIG. 2 can be performed by the processing controller 13 of the antenna device 1 so as to control the antenna portion 11 to transmit and receive signals towards a target beam direction. In step S1, the processing controller 13 obtains a plurality of radio frequency signal parameters respectively in a plurality of measuring beam directions, wherein two adjacencies of the plurality of measuring beam directions have an angle difference therebetween. In step S3, the processing controller 13 can generate a plurality of parameter groups according to the plurality of radio frequency signal parameters, wherein each parameter group comprises more than one of the obtained radio frequency signal parameters. In step S5, the processing controller 13 selects a direction from the aforementioned measuring beam directions to be the target beam direction according to the parameter groups. In step S7, the processing controller 13 controls the antenna portion 11 to transmit and receive signals in this target beam direction.

Figure 3:
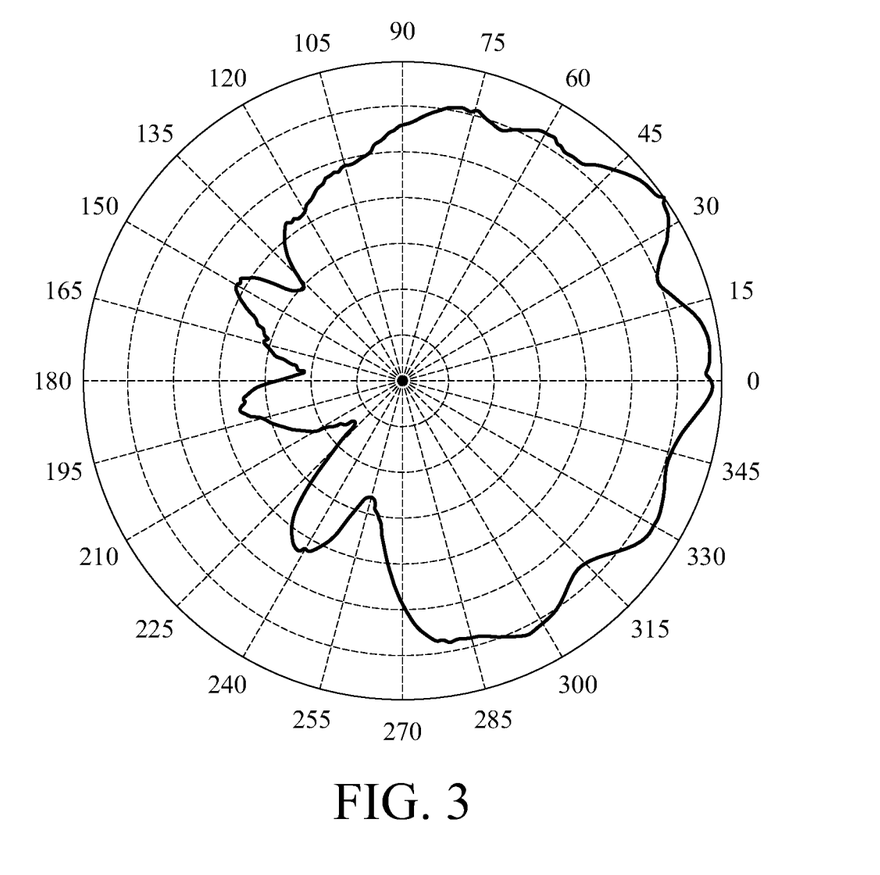
FIG. 3 is a schematic diagram of the measured data of radio frequency signal parameters according to an embodiment of this disclosure.
Figure 4:
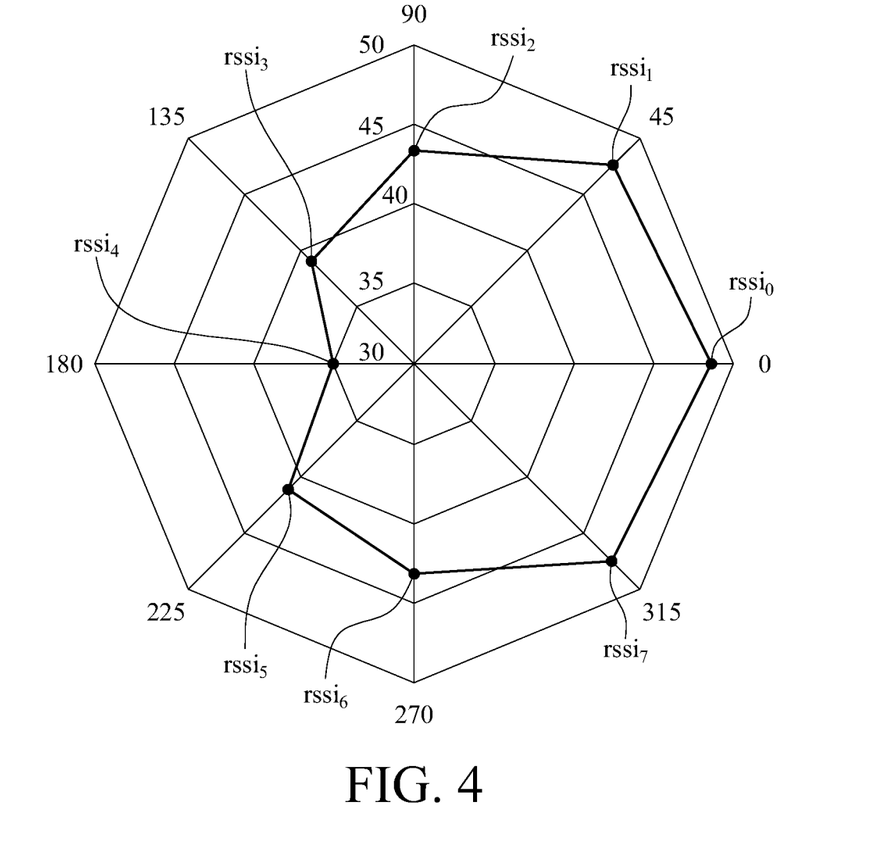
FIG. 4 is a schematic diagram of the normalized data of radio frequency signal parameters according to an embodiment of this disclosure.

For a particular explanation of the obtaining of the radio frequency signal parameters by the processing controller 13 in step S1 in FIG. 2, please refer to FIGS. 3-4, wherein FIG. 3 is a schematic diagram of the measured data of radio frequency signal parameters according to an embodiment of this disclosure, and FIG. 4 is a schematic diagram of the normalized data of radio frequency signal parameters according to an embodiment of this disclosure. In the embodiment as FIGS. 3 and 4 show, the radio frequency signal parameters are associated with received signal strength indicators (RSSI). It should be noted that in the following embodiments, the radio frequency signal parameter is exemplified by RSSI for a further explanation of the antenna control method; however, the radio frequency signal parameter can be other parameter associated with the radiation pattern of the antenna, such as data rate. By selecting the radio frequency signal parameter associated with the radiation pattern of the antenna to serve as the basis for deciding the target beam direction, the antenna control method of this disclosure may not involve hardware specifications for a platform that generates a feed-in signal or performs an operation on the received signal. In other words, when the backend platform of an antenna is replaced or updated, the antenna control method of this disclosure may not be re-designed for matching the replaced or updated specifications; that is, the antenna control method of this disclosure may be highly adaptable.

In step S1 in FIG. 2, the processing controller 13 can control the antenna portion 11 to receive a wireless signal towards a plurality of directions, so as to measure the received signal strength indicators respectively corresponding to the directions. These received signal strength indicators can form a radiation pattern as shown in FIG. 3. The processing controller 13 can calculate the average received signal strength indicators respectively corresponding to several measuring beam directions (including the directions respectively with the azimuth angles of 0, 45, . . . , 270 and 315 degrees), and consider these indicators to respectively be the radio frequency signal parameters $rssi_0$, $rssi_i$, . . . , $rssi_6$ and $rssi_7$ as shown in FIG. 4. In this embodiment, there is an angle difference of 45 degrees between any two adjacencies of the measuring beam directions respectively corresponding to the radio frequency signal parameters. In another embodiment, the angle difference between two adjacencies of the measuring beam directions can be various. For example, the processing controller 13 can obtain the radio frequency signal parameters respectively corresponding to the measuring beam directions with the azimuth angles of 0, 30, 90, 135, 270 and 300 degrees.

Figure 5:
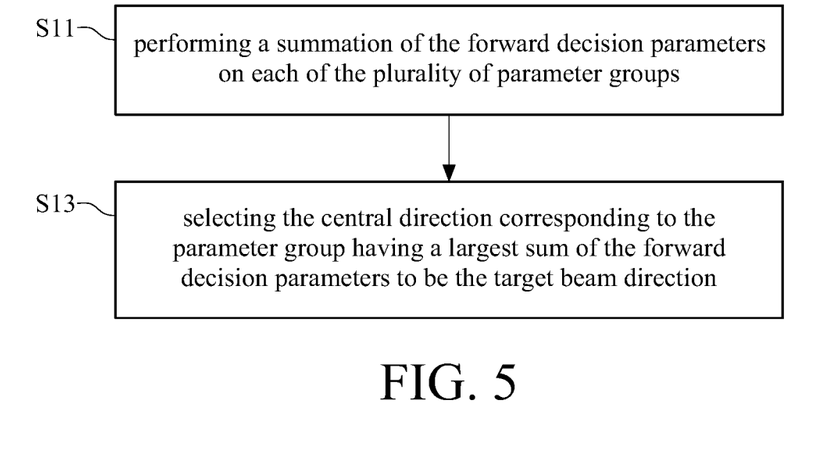
FIG. 5 is a flow chart of a target beam direction deciding procedure in an antenna control method according to an embodiment of this disclosure.

Please refer to FIGS. 1, 2, 4 and 5 for the particular explanation of steps S3 and S5 in FIG. 2. FIG. 5 is a flow chart of the target beam direction deciding procedure in an antenna control method according to an embodiment of this disclosure. In step S3, the processing controller 13 generates a plurality of parameter groups according to the radio frequency signal parameters $rssi_0$-$rssi_7$, wherein each parameter group comprises more than one of the radio frequency signal parameters $rssi_0$-$rssi_7$. In this embodiment, the radio frequency signal parameters of each parameter group comprise an odd number of forward decision parameters, wherein the measuring beam directions respectively corresponding to the forward decision parameters comprise a central direction and the remaining directions which are symmetrically arranged with the central direction as an axis.

For example, each of the parameter groups generated by the processing controller 13 can comprise three radio frequency signal parameters serving as the forward decision parameters. More specifically, one of the parameter groups generated by the processing controller 13 comprises the radio frequency signal parameters $rssi_0$, $rssi_1$ and $rssi_2$ serving as the forward decision parameters. These three forward decision parameters respectively correspond to the measuring beam directions with azimuth angles of 0, 45 and 90 degrees, wherein the measuring beam direction with the azimuth angle of 45 degrees is the central direction, the measuring beam direction with the azimuth angle of 0 degree and the measuring beam direction with the azimuth angle of 90 degrees are the remaining directions symmetrically arranged with the central direction as an axis. Another one of the parameter groups generated by the processing controller 13 comprises the radio frequency signal parameters $rssi_1$, $rssi_2$ and $rssi_3$ which respectively correspond to the measuring beam directions with azimuth angles of 45, 0 and 135 degrees. The measuring beam direction with the azimuth angle of 90 degrees is the central direction, the measuring beam direction with the azimuth angle of 45 degrees and the measuring beam direction with the azimuth angle of 135 degrees are the remaining directions symmetrically arranged with the central direction as an axis. In the same way, the other parameter groups generated by the processing controller 13 can comprise central directions with azimuth angles of 135, 180, 225, 270, 315 and 0 degree, respectively.

In another example, each parameter group can comprise five radio frequency signal parameters $rssi_0$, $rssi_1$, $rssi_2$, $rssi_3$ and $rssi_4$ serving as the forward decision parameters. These five forward decision parameters respectively correspond to the measuring beam directions with azimuth angles of 0, 45, 90, 135 and 180 degrees, wherein the measuring beam direction with the azimuth angle of 90 degrees is the central direction, and the measuring beam directions respectively with the azimuth angles of 0, 45, 135 and 180 degrees are the remaining directions symmetrically arranged with the central direction as an axis. In the above two examples, any two adjacencies of the central direction and the remaining directions have the same angle difference therebetween. However, in other examples, the angle difference between any two adjacencies of the central direction and the remaining directions can be various. In an example, two adjacencies of the directions corresponding to the radio frequency signal parameters in the parameter group have a 45-degree angle therebetween, and other two adjacencies of the directions corresponding to the radio frequency signal parameters in the parameter group have a 90-degree angle therebetween, but this disclosure is not limited to this example.

In particular, the number of the forward decision parameters in each parameter group can be decided based on the transceiving beam width (angle range) of the antenna portion 11. More specifically, the processing controller 13 can set the angle range covered by the directions corresponding to the forward decision parameters in a parameter group to be equal to the transceiving beam width of the antenna portion 11. In an example, the transceiving beam width of the antenna portion 11 of the antenna device 1 is assumed to be 135 degrees, and the antenna device 1 is assumed to have 9 kinds of operating modes including one omnidirectional mode and eight directional modes, wherein said eight directional modes operate respectively towards eight measuring beam directions, and any two adjacencies of said eight measuring beam directions have a 45 degree angle between each other (i.e. equally dividing 360 degrees). In this example, the processing controller 13 will assign three forward decision parameters corresponding to three continuous make each parameter group to each parameter group.

In step S5, the processing controller 13 selects a target beam direction from the measuring beam directions according to the parameter groups each of which comprises an odd number of forward decision parameters. In this embodiment, step S5 in FIG. 2 can include steps S11 and S13 in FIG. 5. In step S11, the processing controller 13 performs the summation of the forward decision parameters on each of the parameter groups. Explained by algebra, the summation processed by the processing controller 13 is as follows:

$$Sum_i = \sum_{j=(i-W)\%N}^{(i+W)\%N} RSSI_j,$$

wherein N represents the number of the total measuring beam directions, the range of i is from 0 to N−1, and W is a function floor (BW/2T), with BW representing the beam width, and T representing the angle difference between two adjacent measuring beam directions.

After obtaining the sum of the forward decision parameters of each parameter group, the processing controller 13 selects the central direction corresponding to the parameter group having the largest sum to be the target beam direction in step S13. In an example based on the data shown in FIG. 4 and assuming that the beam width is 135 degrees and the number of measuring beam directions is 8, the processing controller 13 will determine that the sum of the radio frequency signal parameters $rssi_7$, $rssi_0$ and $rssi_1$ is larger than the sum of the radio frequency signal parameters of any other parameter group, and therefore select the measuring beam direction with the azimuth angle of 0 degree to be the target beam direction.

The above antenna control method takes a number of radio frequency signal parameters and calculates the sum of the radio frequency signal parameters as a comparison parameter for each measuring beam direction, and compares the comparison parameter of each measuring beam direction to decide that the measuring beam direction having the largest comparison parameter is the target beam direction. In comparison with taking only one radio frequency signal parameter as the comparison parameter for each direction, taking a number of radio frequency signal parameters to calculate the comparison parameter may reduce the influence of the noise generated during the measurement, so that the accuracy of the selection of the target beam direction may be improved; that is, the decision of the target beam direction may be closer to the direction with the best signal transmission efficiency, and therefore the antenna gain may be maximized.

Figure 6:
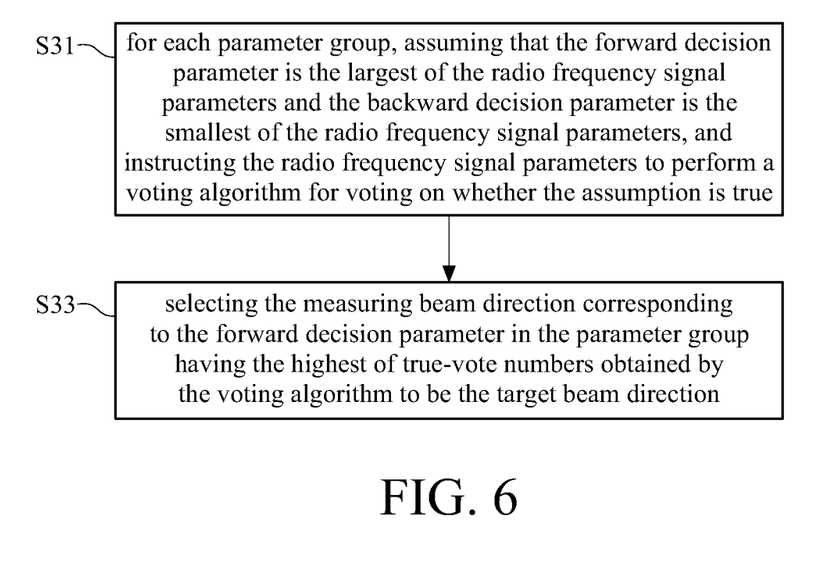
FIG. 6 is a flow chart of a target beam direction deciding procedure in an antenna control method according to another embodiment of this disclosure.

In addition to deciding the target beam direction according to the sum of the forward decision parameters of each parameter group, the processing controller 13 can perform another implementation of the target beam direction deciding procedure. Please refer to FIG. 1, FIG. 2, FIG. 4 and FIG. 6, wherein FIG. 6 is a flow chart of the target beam direction deciding procedure in an antenna control method according to another embodiment of this disclosure. In this embodiment, the radio frequency signal parameters in each of the parameter groups generated by the processing controller 13 in step S3 in FIG. 2 comprise at least a forward decision parameter and a backward decision parameter, wherein a 180-degree angle is between the measuring beam direction corresponding to the forward decision parameter and the measuring beam direction corresponding to the backward decision parameter.

For example, if the processing controller 13 determines that the radio frequency signal parameter $rssi_0$ serves as the forward decision parameter in a parameter group, the processing controller 13 determines that the radio frequency signal parameters $rssi_4$ serves as the backward decision parameter in this parameter groups; if the radio frequency signal parameters $rssi_1$ serves as the forward decision parameter in another parameter group, the radio frequency signal parameters $rssi_5$ is determined to be the backward decision parameter in said another parameter group. In the same manner, the processing controller 13 can further generate parameter groups in which the radio frequency signal parameters $rssi_2$-$rssi_7$ serve as the forward decision parameters respectively.

In step S5, the processing controller 13 selects a target beam direction from the measuring beam directions according to the parameter groups each of which comprises the forward and backward decision parameters. In this embodiment, step S5 in FIG. 2 can include steps S31 and S33 in FIG. 6. In step S31, for each parameter group, the processing controller 13 assumes that the forward decision parameter is the largest of all the radio frequency signal parameters $rssi_0$-$rssi_7$ and the backward decision parameter is the smallest of all the radio frequency signal parameters $rssi_0$-$rssi_7$, and the processing controller 13 instructs all the radio frequency signal parameters $rssi_0$-$rssi_7$ to perform a voting algorithm for voting on whether the above assumption is true. More particularly, the above assumption is based on a backward indentation characteristic of a certain antenna pattern. The backward indentation characteristic means that in the antenna pattern, the backside region of the range in which the larger value is distributed, especially the backward direction corresponding to the maximum value, has a null point.

Taking FIG. 4 as an example, in the radiation pattern formed by the radio frequency signal parameters of the antenna portion 11, the direction having the maximum value is the direction with the azimuth angle of 0 degree and an indentation exists on its backward direction (i.e. the direction with the azimuth angle of 180 degrees).

During the operation of the above voting algorithm, the processing controller 13 determines whether the radio frequency signal parameters other than the forward and backward decision parameters are larger than the backward decision parameter and smaller than the forward decision parameter. If the determined result is true, the true-vote number is increased by one; if the determined result is false, the true-vote number is unchanged. Using algebra for explanation, the processing controller 13 defines that if $rssi_{(i+N/2)\%N} < rssi_j < rssi_i$, $agree_{(i,j)}$ is 1, and if $rssi_j$ is not in the above range, $agree_{(i,j)}$ is 0. The processing controller 13 performs the voting algorithm as follows:

$$vote_i = \sum_{j=0}^{N-1} agree_{(i,j)},$$

wherein N represents the number of the measuring beam directions, and j is equal to neither i nor (i+N/2)%N After calculating the true-vote number of each parameter group, in step S33, the processing controller 13 selects the measuring beam direction corresponding to the parameter group having the highest of true-vote numbers generated by the voting algorithm to be the target beam direction. In an example based on the data shown in FIG. 4, by the above voting algorithm, the processing controller 13 can determine that the parameter group in which the radio frequency signal parameters $rssi_0$ serves as the forward decision parameter has the highest true-vote number, and therefore selects the measuring beam direction with the azimuth angles of 0 degree to be the target beam direction.

Moreover, each parameter group can include multiple pairs of the forward and backward decision parameters. The directions corresponding to these forward decision parameters contain a first central direction and the remaining directions which are symmetrically arranged with the first central direction as an axis; the directions corresponding to the backward decision parameters contain a second central direction and the remaining directions which are symmetrically arranged with the second central direction as an axis; wherein a 180-degree angle is between the first and second central directions. In this case, the processing controller 13 performs the voting algorithm on each pair of the forward and backward decision parameters in the parameter group, adds the true-vote number of every pairs together to obtain a total true-vote number of the parameter group. The processing controller 13 obtains the total true-vote number of every parameter group by the above method, compares the obtained total true-vote numbers, and selects the first central direction corresponding to the parameter group having the highest total true-vote number to be the target beam direction.

The above antenna control method takes, for each measuring beam direction, its radio frequency signal parameters and the radio frequency signal parameters of its backward direction, makes assumption using the backward indentation characteristic of the antenna radiation pattern and performs the voting algorithm, and compares the results of the voting algorithm of the measuring beam directions to decide that the measuring beam direction having the highest true-vote number is the target beam direction. In comparison with taking only one radio frequency signal parameter as the comparison parameter for each direction, taking a number of radio frequency signal parameters to calculate the comparison parameter may reduce the influence of the noise generated during the measurement, so that the accuracy of the selection of the target beam direction may be improved; that is, the decision of the target beam direction may be closer to the direction with the best signal transmission efficiency, and therefore the antenna gain may be maximized.

The above embodiments describe the target beam direction deciding procedure performed according to the sum of the forward decision parameters in each parameter group and the target beam direction deciding procedure performed by the voting algorithm. In yet another embodiment, the processing controller 13 can combine the above two procedures. Please refer to FIG. 1, FIG. 2 and FIG. 7, wherein FIG. 7 is a flow chart of a target beam direction deciding procedure in an antenna control method according to yet another embodiment of this disclosure.

In this embodiment, the radio frequency signal parameters in each of the parameter groups generated by the processing controller 13 in step S3 in FIG. 2 comprise at least an odd number of forward decision parameters and a backward decision parameter. The measuring beam directions respectively corresponding to these forward decision parameters comprise a central direction and the remaining directions which are symmetrically arranged with the central direction as an axis, wherein these forward decision parameters are similar to those described in the aforementioned embodiment of FIG. 5. The relationship between the backward decision parameter and the forward decision parameter corresponding to the central direction is similar to that between the forward decision parameter and the backward decision parameter as described in the aforementioned embodiment of FIG. 6; that is, a 180-degree angle is between the central direction and the measuring beam direction corresponding to the backward decision parameter.

Figure 7:
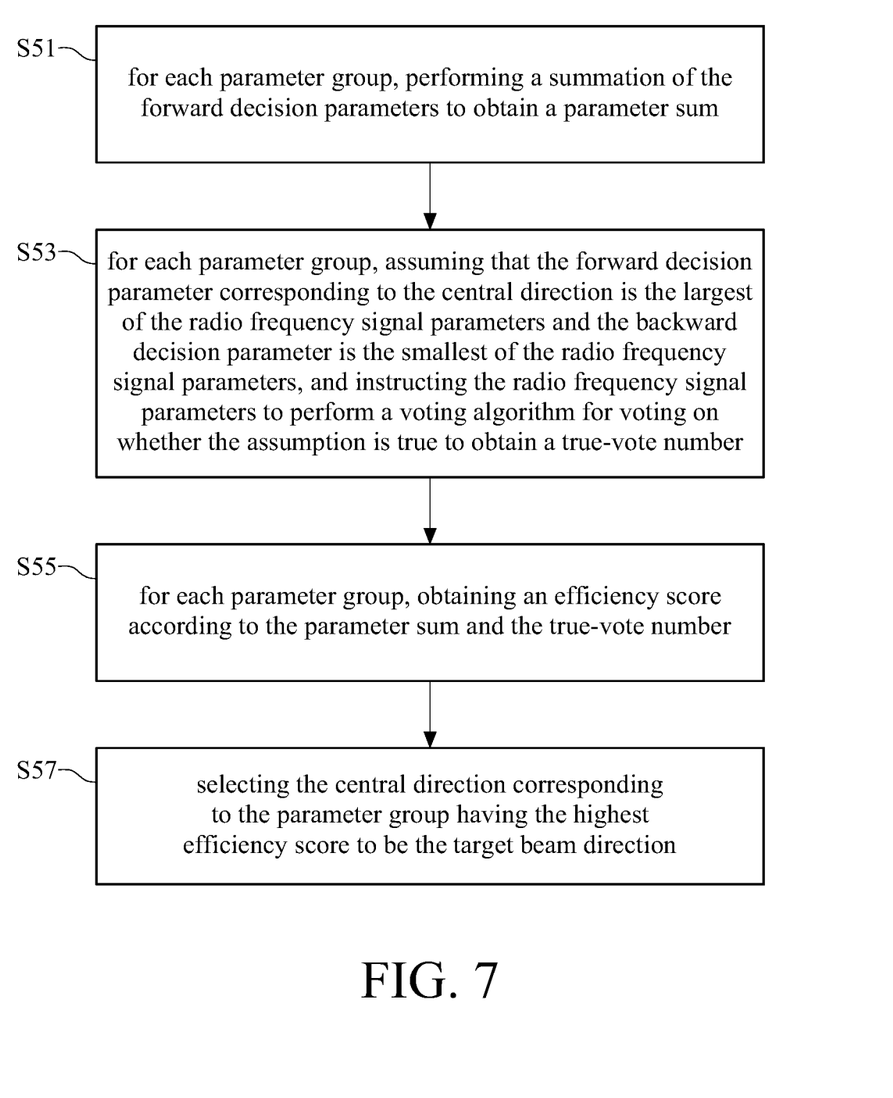
FIG. 7 is a flow chart of a target beam direction deciding procedure in an antenna control method according to yet another embodiment of this disclosure.

In this embodiment, step S5 in FIG. 2 can includes steps S51-S57 in FIG. 7. In step S51, the processing controller 13 performs the summation of the forward decision parameters on each parameter group to obtain the parameter sum of each parameter group. The details of this step are similar to those of step S11 in the aforementioned embodiment of FIG. 5, so they are not repeated here. In step S53, for each parameter group, the processing controller 13 assumes that the forward decision parameter is the largest of all the radio frequency signal parameters and the backward decision parameter is the smallest of all the radio frequency signal parameters, and instructs the radio frequency signal parameters to perform the voting algorithm for voting on whether the above assumption is true to obtain the true-vote number of each parameter group. The details of this step are similar to those of step S31 in the aforementioned embodiment of FIG. 6, so they are not repeated here. It should be noted that the order of step S51 and step S53 is not limited in this disclosure, and these two step can be performed simultaneously. In steps S55-S57, the processing controller 13 obtains an efficiency score of each parameter group according to its parameter sum and its true-vote number, and then selects the central direction corresponding to the parameter group having the highest efficiency score to be the target beam direction.

Figure 8:
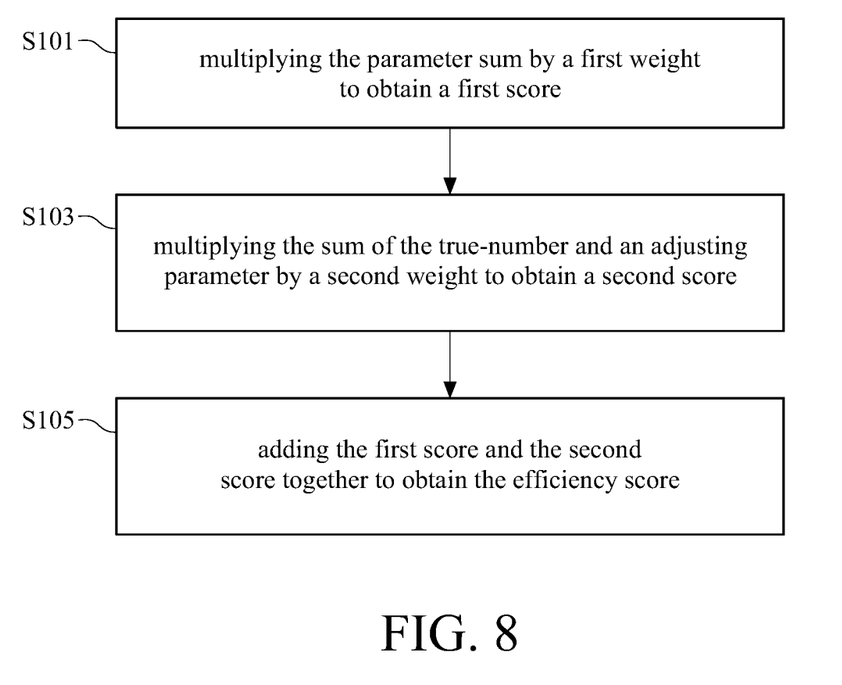
FIG. 8 illustrates an implementation of obtaining an efficiency score in a target beam direction deciding procedure in an antenna control method.

More particularly, please refer to FIG. 1, FIG. 7 and FIG. 8, wherein FIG. 8 illustrates an implementation of obtaining an efficiency score in the target beam direction deciding procedure in the antenna control method. In the embodiment of FIG. 8, the processing controller 13 performs steps S101-S105 to obtain the efficiency score of each parameter group. In step S101 in FIG. 8, the processing controller 13 multiplies the parameter sum, obtained in step S51 of FIG. 7, by a first weight to obtain a first score; in step S103 in FIG. 8, the processing controller 13 adds the true-vote number obtained in step S53 in FIG. 7 and an adjusting parameter together, and multiplies the sum of the true-vote number and the adjusting parameter by a second weight to obtain a second score; and in step S105 in FIG. 8, the processing controller 13 adds the first score and the second score together to obtain the efficiency score. Explained by algebra, steps S101-S105 performed by the processing controller 13 can be regarded as the following equation:

$$Score_i = \alpha \times Sum_i + \beta \times (Vote_i + \gamma),$$

wherein $Score_i$ represents the efficiency score, $Sum_i$ represents the parameter sum, $Vote_i$ represents the true-vote number, $\alpha$ represents the first weight, $\beta$ represents the second weight, and $\gamma$ represents the adjusting parameter.

Since the value ranges of the parameter sum and the true-vote number are very different, in order to balance the influence of the two on the efficiency score, the processing controller 13 performs linear normalization using the first weight, the second weight and the adjusting parameter, wherein the values of the first weight, the second weight and the adjusting parameter are determined based on the type or characteristics of the antenna portion 11. For example, in comparison with the antenna portion 11 of which the backward indentation characteristic of the radiation pattern is apparent, the second weight of the antenna portion 11 of which the backward indentation characteristic is not apparent is set as a lower value. Preferably, the first weight is set to be larger than the second weight. In comparison with considering only one principle, the above antenna control method is implemented by combining two principles and then may have better decision of the target beam direction which is closer to the best beam direction, that is, the direction with the best signal transmission efficiency.

Figure 9:
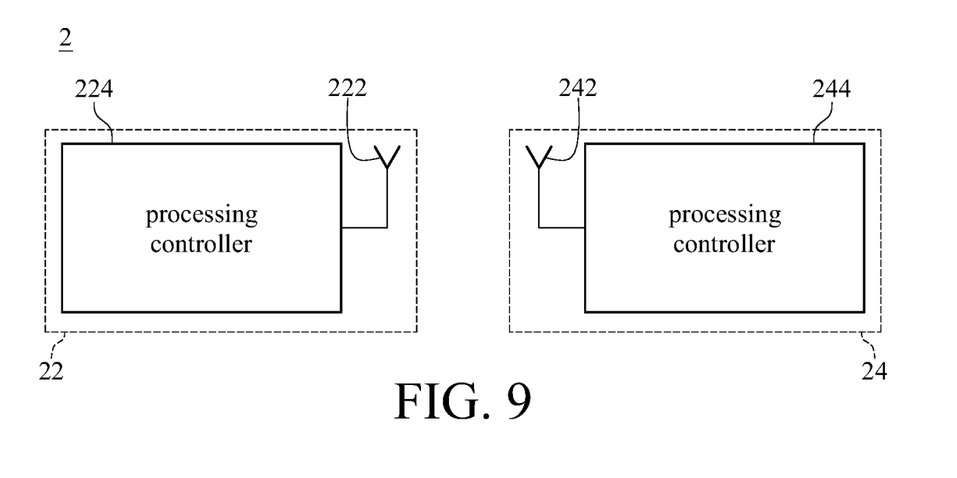
FIG. 9 is a function block diagram of a communication system to which communication system control methods in embodiments of this disclosure are applied.
Figure 10:
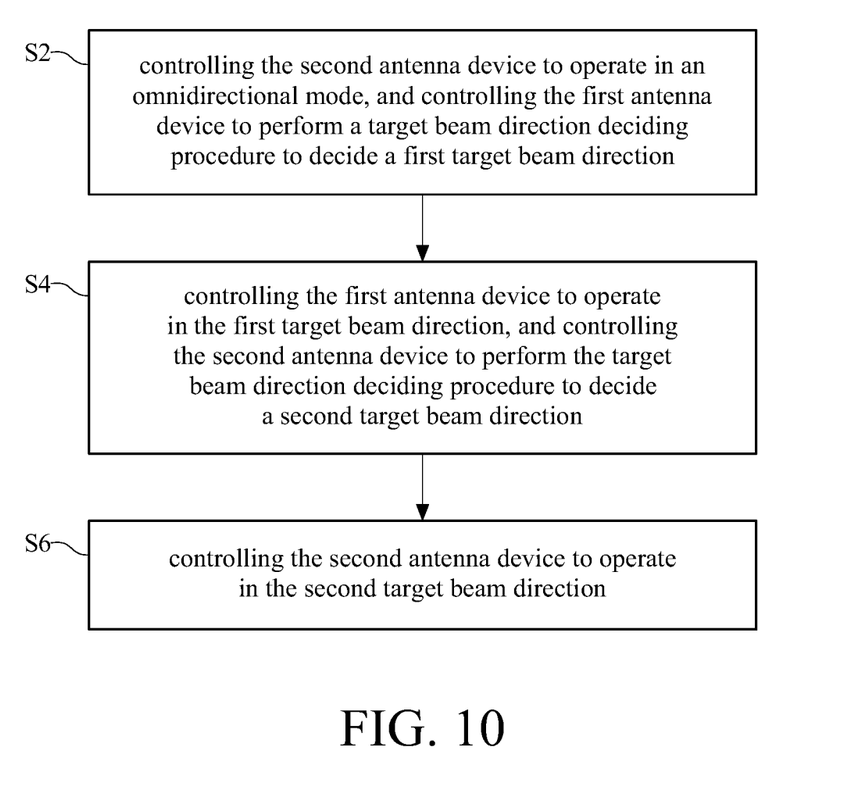
FIG. 10 is a flow chart of a communication system control method according to an embodiment of this disclosure.

A communication system control method is also provided in this disclosure. Please refer to FIG. 9 and FIG. 10, wherein FIG. 9 is a function block diagram of a communication system to which communication system control methods in embodiments of this disclosure are applied, and FIG. 10 is a flow chart of a communication system control method according to an embodiment of this disclosure. As shown in FIG. 9, a communication system 2 comprises a first antenna device 22 and a second antenna device 24. The first and second antenna devices 22 and 24 are similar to the antenna device 1 as aforementioned in the embodiment of FIG. 1, wherein the first antenna device 22 comprises an antenna portion 222 and a processing controller 224, and the second antenna device 24 comprises an antenna portion 242 and a processing controller 244. The hardware details of each of the above components are not described again here. In an embodiment, the first antenna device 22 and the second antenna device 24 of the communication system 2 can establish a backhaul connection therebetween through a mesh network. For example, the first antenna device 22 is a radio base station (CAP), and the second antenna device 24 is radio equipment (RE).

The communication system control method shown in FIG. 10 can apply to the communication system 2 for respectively deciding and controlling the target beam directions of the first and second antenna devices 22 and 24 of the communication system 2. In step S2, the second antenna device 24 is controlled to operate in the omnidirectional mode, and the first antenna device 22 is controlled to perform a target beam direction deciding procedure to decide a first target beam direction. In step S4, the first antenna device 22 is controlled to operate with the first target beam direction, and the second antenna device 24 is controlled to perform the target beam direction deciding procedure to decide a second target beam direction. In step S6, the second antenna device 24 is controlled to operate with the second target beam direction.

More particularly, the target beam direction deciding procedure comprises: obtaining a plurality of radio frequency signal parameters respectively in a plurality of measuring beam directions, wherein two adjacencies of the plurality of measuring beam directions have an angle difference therebetween; generating a plurality of parameter groups according to the plurality of radio frequency signal parameters, wherein each of the plurality of parameter groups comprises more than one of the plurality of radio frequency signal parameters; and selecting one of the plurality of measuring beam directions according to the plurality of parameter groups to be the target beam direction (the first or second beam direction as aforementioned). The selection of the target beam direction can be performed based on the sum of the forward decision parameters of each of the parameter groups, or based on the calculated result of the voting algorithm, or by a target beam direction deciding procedure combining the above two. The detailed implementation has described in the previous embodiments, and is not repeated here. The first and second antenna devices 22 and 24 can respectively decide the first and second target beam directions by performing the above target beam direction deciding procedure.

In an embodiment, the first antenna device 22 and the second antenna device 24 can be controlled to perform steps S2-S6 by a monitor console included in the communication system 2 or located outside the communication system 2. In another embodiment, steps S2-S6 can be performed by the processing controller 224 of the first antenna device 22 and the processing controller 244 of the second antenna device 24. More particularly, the processing controllers 224 and 244 of the first and second antenna devices 22 and 24 can check whether each other is in the connectable communication range firstly. After checking, the processing controller 244 of the second antenna device 24 can control the antenna portion 242 to transmit and receive signals in the omnidirectional mode, control the processing controller 224 of the first antenna device 22 to perform the target beam direction deciding procedure to decide the first target beam direction, and generate a notification signal indicating that the first target beam direction is decided. The processing controller 224 of the first antenna device 22 then controls the antenna portion 222 to transmit and receive signals in the first target beam direction. The processing controller 244 of the second antenna device 24 receives the notification signal from the first antenna device 22, and accordingly performs the target beam direction deciding procedure to decide the second target beam direction, and then controls the antenna portion 242 to transmit and receive signals in the second target beam direction.

In general, for two antenna devices each of which has N measuring beam directions, the number of the combinations of the measuring beam beams of the two antenna devices is the square of N. It will take a lot of time to calculate the signal transceiving efficiency corresponding to each combination one by one. By the communication system control method provided in the above embodiment of this disclosure, only the signal transceiving efficiencies of 2N combinations have to be calculated; thereby, the execution time of the target beam direction combination determination process may be reduced.

Figure 11:
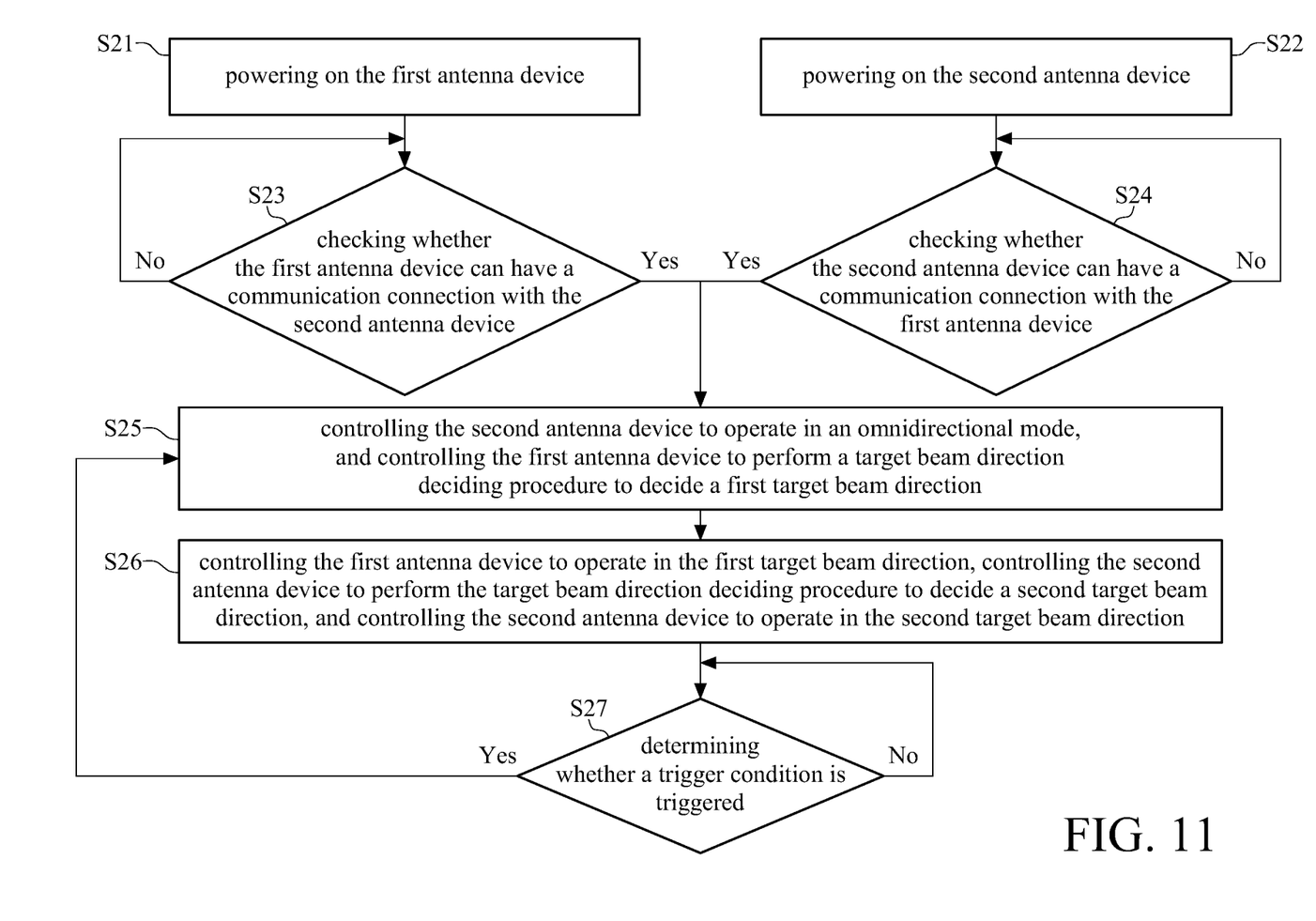
FIG. 11 is a flow chart of a communication system control method according to another embodiment of this disclosure.

Please refer to FIGS. 9 and 11, wherein FIG. 11 is a flow chart of a communication system control method according to another embodiment of this disclosure. In step S21, the first antenna device 22 is powered on. In step S22, the second antenna device 24 is powered on. In step S23, the processing controller 224 of the first antenna device 22 checks whether the first antenna device 22 can have a communication connection with the second antenna device 24. In step S24, the processing controller 244 of the second antenna device 24 checks whether the second antenna device 24 can have a communication connection with the first antenna device 22. If the checked results of steps S23 and S24 are positive (i.e. "yes"), step S25 is then performed. If the checked result of any one of steps S23 and S24 is negative (i.e. "no"), said one of steps S23 and S24 is performed again. When the number of times or the time of performing step S23 or step S24 exceeds a preset value, the first antenna device 22, the second antenna device 24, or the monitor console connected with the first and second antenna devices 22 and 24 outputs an indication signal to show a connection error. It should be noted that neither the order of steps S21 and S22 nor the order of steps S23 and S24 is limited in this disclosure. Furthermore, the above check procedure is an optional procedure, the monitor console can perform the control of the first and second antenna devices 22 and 24 from step S25.

In step S25, the second antenna device 24 is controlled to operate in the omnidirectional mode, and the first antenna device 22 is controlled to perform the target beam direction deciding procedure to decide a first target beam direction. In step S26, the first antenna device 22 is controlled to operate in the first target beam direction, and the second antenna device 24 is controlled to perform the target beam direction deciding procedure to decide a second target beam direction, and the second antenna device 24 is controlled to operate in the second target beam direction. The execution of steps S25 and S26 is similar to that of steps of S2-S6 in the embodiment of FIG. 10, so it is not repeated here.

In this embodiment, after the target beam directions of the first and second antenna devices 22 and 24 are decided, whether a trigger condition is triggered is determined, as shown in step S27. If the determined result is true, the first and second target beam directions are re-decided; that is, steps S25 and S26 are re-performed. The trigger condition can comprise a condition in which a change value of an average radio frequency signal parameter of the first antenna device 22 or the second antenna device 24 is larger than a preset threshold. For example, the preset threshold is 5 dbm. More particularly, the signal transceiving efficiency of the first antenna device 22 or the second antenna device 24 may change as the communication environment changes. When the change is larger, the signal transceiving direction with the best efficiency may be changed. Determining step S27 in this embodiment can be adapted to the above situation so as to improve the adaptability of the communication system 2. In an embodiment, determining step S27 can be performed periodically; or, the first antenna device 22, the second antenna device 24 or the monitor console can perform step S27 as detecting the change of the communication environment.

In another embodiment, when the trigger condition is triggered, the first and second target beam directions are re-decided, and besides, this trigger event (i.e. the event of triggering the trigger condition) is recorded. The first antenna device 22, the second antenna device 24 or the monitor console can count the number of the trigger events, that is, the number of triggered times of the trigger condition. When the number of triggered times is more than the preset number of times (e.g. three times), the first antenna device 22, the second antenna device 24 or the monitor console increases the preset threshold serving as the determining basis of the trigger condition as aforementioned. More particularly, when the communication system 2 is in an unstable communication environment, the average radio frequency signal parameter of the antenna devices may vary within a larger range. In order to prevent the system from excessively re-deciding the signal transceiving direction due to the above situation, the aforementioned preset threshold can be adjusted according to the time interval between the last several times of the execution of re-deciding the signal transceiving direction.

In view of the above description, the antenna control method provided in this disclosure selects the radio frequency signal parameters associated with the radiation pattern of an antenna to serve as the basis for deciding the target beam direction, and may not involve hardware specifications for a platform that generates a feed-in signal or performs an operation on the received signal. Therefore, the antenna control method of this disclosure may have high adaptability. By taking a number of radio frequency signal parameters to form the basis for deciding the target beam direction, the antenna control method provided in this disclosure may reduce the influence of the noise generated during the measurement, so that the accuracy of the selection of the target beam direction may be improved; that is, the decision of the target beam direction may be closer to the direction with the best signal transmission efficiency. Moreover, the communication system control method provided in this disclosure controls two antenna devices which are connected with each other to perform the target beam direction deciding procedure by turns, so that the number of the combinations of the measuring beam beams of the two antenna devices may be decreased, and therefore the operation time may be reduced, and the execution efficiency may be improved.

What is claimed is:

1. An antenna control method, comprising:
    obtaining a plurality of radio frequency signal parameters respectively in a plurality of measuring beam directions, wherein two adjacencies of the plurality of measuring beam directions have an angle difference therebetween;
    generating a plurality of parameter groups according to the plurality of radio frequency signal parameters, wherein each of the plurality of parameter groups comprises more than one of the plurality of radio frequency signal parameters;
    selecting a target beam direction from the plurality of measuring beam directions according to the plurality of parameter groups; and
    controlling an antenna to transmit and receive signals in the target beam direction;
    wherein the radio frequency signal parameters in each of the plurality of parameter groups comprise an odd number of forward decision parameters, and the measuring beam directions respectively corresponding to the forward decision parameters comprise a central direction and remaining directions which are symmetrically arranged with the central direction as an axis, and wherein selecting the target beam direction from the plurality of measuring beam directions according to the plurality of parameter groups comprises:
  performing a summation of the forward decision parameters on each of the plurality of parameter groups; and
  selecting the central direction corresponding to the parameter group having a largest sum of the forward decision parameters to be the target beam direction.

2. The antenna control method according to claim 1, wherein any two adjacencies of the central direction and the remaining directions have the angle difference therebetween.

3. An antenna control method, comprising:
  obtaining a plurality of radio frequency signal parameters respectively in a plurality of measuring beam directions, wherein two adjacencies of the plurality of measuring beam directions have an angle difference therebetween;
  generating a plurality of parameter groups according to the plurality of radio frequency signal parameters, wherein each of the plurality of parameter groups comprises more than one of the plurality of radio frequency signal parameters;
  selecting a target beam direction from the plurality of measuring beam directions according to the plurality of parameter groups; and
  controlling an antenna to transmit and receive signals in the target beam direction;
  wherein the radio frequency signal parameters in each of the plurality of parameter groups comprise a forward decision parameter and a backward decision parameter, with a 180-degree angle between the measuring beam direction corresponding to the forward decision parameter and the measuring beam direction corresponding to the backward decision parameter, and wherein selecting the target beam direction from the plurality of measuring beam directions according to the plurality of parameter groups comprises:
    for each of the plurality of parameter groups, assuming that the forward decision parameter is the largest of the plurality of radio frequency signal parameters and the backward decision parameter is the smallest of the plurality of radio frequency signal parameters, and instructing the plurality of radio frequency signal parameters to perform a voting algorithm for voting on whether the assumption is true; and
    selecting the measuring beam direction corresponding to the forward decision parameter in the parameter group having the highest of true-vote numbers obtained by the voting algorithm to be the target beam direction.

4. An antenna control method, comprising:
  obtaining a plurality of radio frequency signal parameters respectively in a plurality of measuring beam directions, wherein two adjacencies of the plurality of measuring beam directions have an angle difference therebetween;
  generating a plurality of parameter groups according to the plurality of radio frequency signal parameters, wherein each of the plurality of parameter groups comprises more than one of the plurality of radio frequency signal parameters;
  selecting a target beam direction from the plurality of measuring beam directions according to the plurality of parameter groups; and
  controlling an antenna to transmit and receive signals in the target beam direction;
  wherein the radio frequency signal parameters in each of the plurality of parameter groups comprise an odd number of forward decision parameters and a backward decision parameter, the measuring beam directions respectively corresponding to the forward decision parameters comprise a central direction and remaining directions which are symmetrically arranged with the central direction as an axis, and a 180-degree angle is between the central direction and the measuring beam direction corresponding to the backward decision parameter, and wherein selecting the target beam direction from the plurality of measuring beam directions according to the plurality of parameter groups comprises:
    for each of the plurality of parameter groups, performing:
      performing a summation of the forward decision parameters to obtain a parameter sum;
      assuming that the forward decision parameter corresponding to the central direction is the largest of the plurality of radio frequency signal parameters and the backward decision parameter is the smallest of the plurality of radio frequency signal parameters, and instructing the plurality of radio frequency signal parameters to perform a voting algorithm for voting on whether the assumption is true to obtain a true-vote number; and
      obtaining an efficiency score according to the parameter sum and the true-vote number; and
    selecting the central direction corresponding to the parameter group having a highest efficiency score to be the target beam direction.

5. The antenna control method according to claim 4, wherein obtaining the efficiency score according to the parameter sum and the true-vote number comprises:
  multiplying the parameter sum by a first weight to obtain a first score;
  multiplying a sum of the true-vote number and an adjusting parameter by a second weight to obtain a second score; and
  adding the first score and the second score together to obtain the efficiency score.

6. The antenna control method according to claim 5, wherein the first weight is larger than the second weight.

7. A communication system control method applied to a communication system comprising a first antenna device and a second antenna device, and the communication system control method comprising:
  controlling the second antenna device to operate in an omnidirectional mode, and controlling the first antenna device to perform a target beam direction deciding procedure to decide a first target beam direction;
  controlling the second antenna device to perform the target beam direction deciding procedure to decide a second target beam direction as controlling the first antenna device to operate in the first target beam direction;
  controlling the second antenna device to operate in the second target beam directions;
  when a trigger condition is triggered, re-performing deciding the first target beam direction and deciding the second target beam direction, wherein the trigger condition comprises a condition in which a change value of an average radio frequency signal parameter of the first antenna device or the second antenna device is larger than a preset threshold;

counting a number of triggered times of the trigger condition; and when the number of triggered times is more than preset number of times, increasing the preset threshold.

8. The communication system control method according to claim 7, wherein the target beam direction deciding procedure comprises:

obtaining a plurality of radio frequency signal parameters respectively in a plurality of measuring beam directions, wherein two adjacencies of the plurality of measuring beam directions have an angle difference therebetween;

generating a plurality of parameter groups according to the plurality of radio frequency signal parameters, wherein each of the plurality of parameter groups comprises more than one of the plurality of radio frequency signal parameters; and selecting one of the plurality of measuring beam directions according to the plurality of parameter groups to be the first target beam direction or to be the second target beam direction.

* * * * *